United States Patent [19]
Wetzel

[11] 3,959,692
[45] May 25, 1976

[54] MONITOR AND CONTROLLER FOR HEATING A RESISTIVE ELEMENT

[75] Inventor: Donald A. Wetzel, Upper St. Clair, Pa.

[73] Assignee: Westinghouse Electric Corporation, Pittsburgh, Pa.

[22] Filed: Sept. 18, 1974

[21] Appl. No.: 507,161

[52] U.S. Cl. .......................... 317/13 B; 317/40 R; 324/62; 219/497; 219/499
[51] Int. Cl.² ........................................ H02H 7/08
[58] Field of Search .............. 317/13 B, 13 R, 14 C, 317/14 H, 42, 40 R, 133.5, 41, 132; 219/497, 499; 318/558, 436, 471, 472, 473; 324/65 R, 62

[56] References Cited
UNITED STATES PATENTS

| | | | |
|---|---|---|---|
| 2,912,644 | 11/1959 | Makous | 317/42 |
| 2,918,558 | 12/1959 | Evans | 219/499 |
| 3,195,044 | 7/1965 | Flanagan | 219/499 |
| 3,327,167 | 6/1967 | Schaefer | 317/40 R |
| 3,445,743 | 5/1969 | Blair | 318/436 |
| 3,582,712 | 6/1971 | Blair | 317/13 R |
| 3,789,190 | 1/1974 | Orosy et al. | 219/499 |
| 3,809,960 | 5/1974 | Jossic | 317/13 B |

OTHER PUBLICATIONS

IBM Tech. Disclosure Bulletin, Vol. 15, No. 4, 9/72, "Print Hammer Coil Temp. Measurement;" by Wray; p. 1243.

*Primary Examiner*—Gerald Goldberg
*Assistant Examiner*—Patrick R. Salce
*Attorney, Agent, or Firm*—W. A. Elchik

[57] ABSTRACT

Apparatus for controlling the heating of an electric element which repeatedly disconnects the electric element from the heating power supply and connects a resistor in series with the electric element and an electric potential across the series combination, when the voltage drop across the electric element is above a predetermined level, heating power is not reconnected to the electric element. The controller utilizes an adjustable time delay for providing the time period for which heating power is applied to the electric element. After each heating cycle the voltage drop across the electric element is monitored. The length of the monitoring cycle is controlled by a time delay and a voltage sensitive contact connected across the electric element. The monitoring cycle will terminate after a time delay, unless the voltage drop across the electric element is above a predetermined value, in which case it will continue until the voltage drop falls below the predetermined level. In other words when the electric element is heated its resistance increases thereby increasing the voltage drop across the electric element when a fixed potential is applied across the electric element and resistance in series. When the voltage drop across the electric element is above a predetermined value, the electric element remains isolated from the heating power supply.

1 Claim, 5 Drawing Figures

3,959,692

MONITOR AND CONTROLLER FOR HEATING A RESISTIVE ELEMENT

BACKGROUND OF THE INVENTION

This invention relates to a process control and more particularly to a method and apparatus for controlling the heating of an electric element. The teaching of this invention is particularly applicable for controlling electric heating of windings on electrical equipment.

Prior art methods of monitoring and controlling temperatures of electric coils being heated have utilized thermistors, thermocouples, thermometers or other temperature sensing devices disposed in close proximity to the windings. A device which normally provides for continuous control of the sensed temperature have disadvantages when used for controlling the temperature of an electrically heated winding. Since the continuous sensing device must have a temperature sensor near the winding this necessitates a specially constructed winding or embedding the sensor in the insulation. When the winding is disposed in a solid insulation, the prior art temperature sensors also have to be contained in the insulation close to the winding. This is a complicated and expensive procedure. When a temperature sensor is embedded in the solid insulation surrounding, say a stator winding, there is a possibility of problems during later operation of the electric apparatus.

SUMMARY OF THE INVENTION

A monitor and controller for controlling the heating of an electric winding from a power source is provided, which has a switch which when closed connects the electric winding to the power source and which when open isolates the electric winding therefrom. A resistor is connected in series with the stator, when the stator is disconnected from the power source, and a controller supplies a potential across the stator and resistor in series, and keeps the stator disconnected from the power source when the voltage drop across the stator winding exceeds a predetermined level, indicating the desired temperature has been exceeded. My invention, thus discloses a method for controlling the temperature of an electric winding by comparing a change in resistance of the winding due to temperature with a reference resistor and preventing heating of the electric winding when temperature is above a preselected value. The temperature of the winding is monitored at preselected intervals. That is, heating power is applied to the winding for a selected period of time after which the temperature of the winding is monitored by reading the voltage drop across the winding and reference resistance in series; if the winding temperature reaches the desired level heating power is not reapplied until the temperature level of the winding has dropped sufficiently. Thus, the temperature of the winding being heated is controlled in a band around the desired temperature.

The resistor which is connected in series with the electric winding when the electric winding is disconnected from the heating power source is preferably adjustable. Then the adjustable resistor can then be varied so that a predetermined portion of voltage drop from the monitoring power supply, connected across the winding and the resistor, occurs across each component when they are both at the same ambient temperature. Thus, as the stator winding is heated with respect to the reference resistor an increased voltage drop will occur across the electric winding, caused by an increase in resistance in the electric winding due to and related to the temperature rise.

The monitoring potential which is applied to the electric winding and reference resistor in series, during temperature monitoring, is a direct current. The monitoring voltage which is variable is obtained from a variable transformer which feeds a full wave rectifier. Volt meters are provided for reading the voltage drop across the resistor, across the stator winding, and for indicating the output of the monitor potential power supply. The voltmeter which reads the potential drop across the electric winding has an auxillary contact set point which can be adjusted to be activated when the voltage being read exceeds a preselected level. During a typical operation the variable resistor and the variable monitoring potential are adjusted so that for a desired temperature a predetermined voltage drop will occur across the electric winding. The meter which reads the voltage drop across the electric winding is then set to deenergize contacts controlling the heating power supply contacts if the desired temperature is exceeded, thus preventing heat from being reapplied to the electric winding until the winding has cooled.

The disclosed monitoring and control apparatus is not a controller in the same sense that a thyristor, thermocouple, infrared detector, or the like operate in controlling temperature. That is, the disclosed monitor controller does not remain in the circuit during the heating cycle so it cannot turn the power off. The disclosed monitor controller is connected in the circuit at preselected intervals and prevents heating power from being reapplied to the electric winding when the temperature of the electric winding has exceeded the selected level. Thus the temperature of the winding is controlled around the selected level.

It is an object of this invention to disclose a method and apparatus for controlling the temperature of an electric winding, disposed in solid insulation, without embedding a temperature detector in the solid insulation.

A further object of this invention is to provide apparatus for controlling the temperature of an electric winding which relies only on the change resistance of the electric winding and does not require an additional temperature sensor.

It is a further object of this invention to provide a temperature controller which measures the temperature of an electric winding only at selected intervals and prevents further heating of the electric winding when the desired temperature has been exceeded.

DESCRIPTION OF THE PREFERRED EMBODIMENTS

Figure 1:
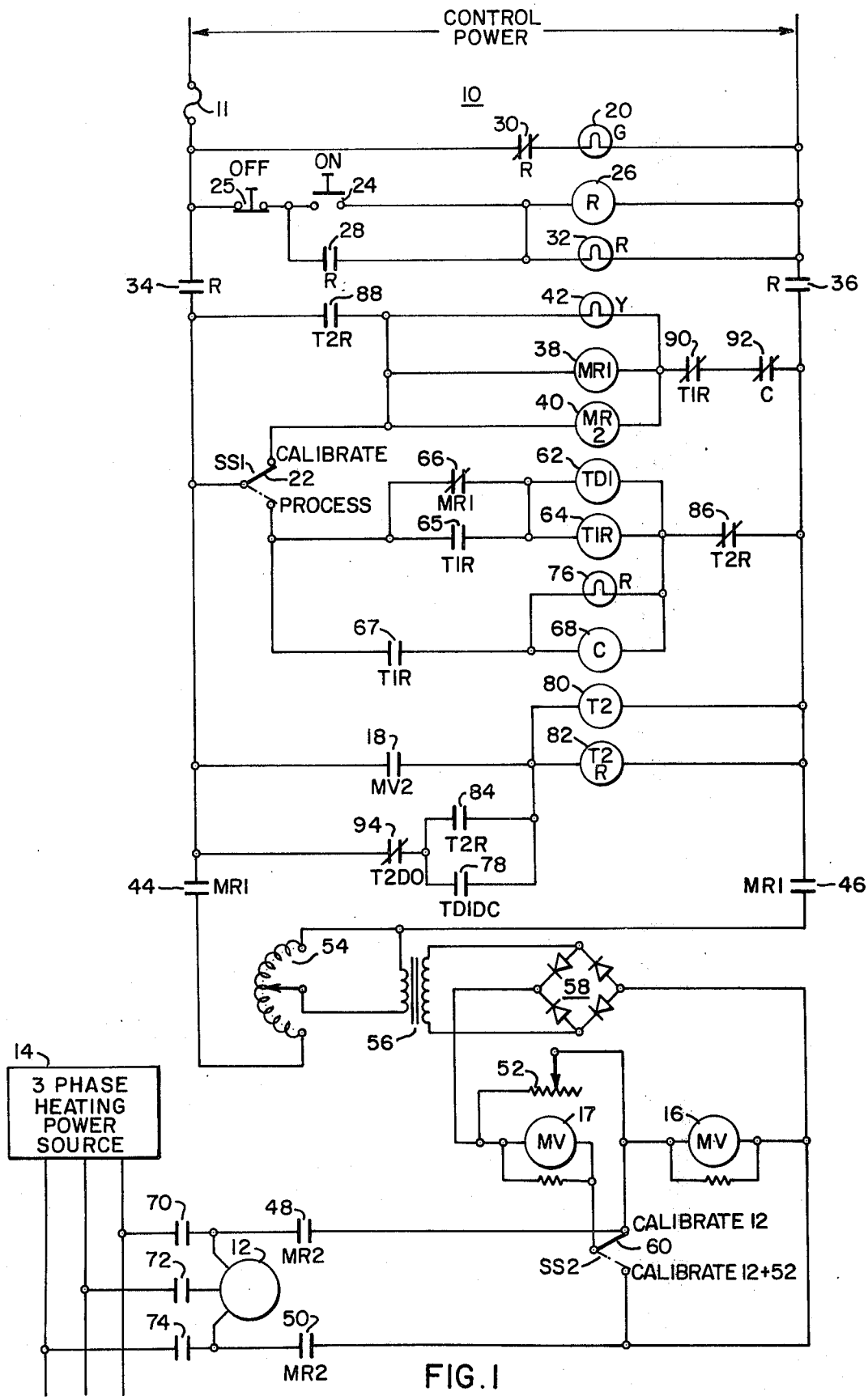
FIG. 1 is a schematic diagram of apparatus utilizing the teaching of the present invention.
Figure 2:
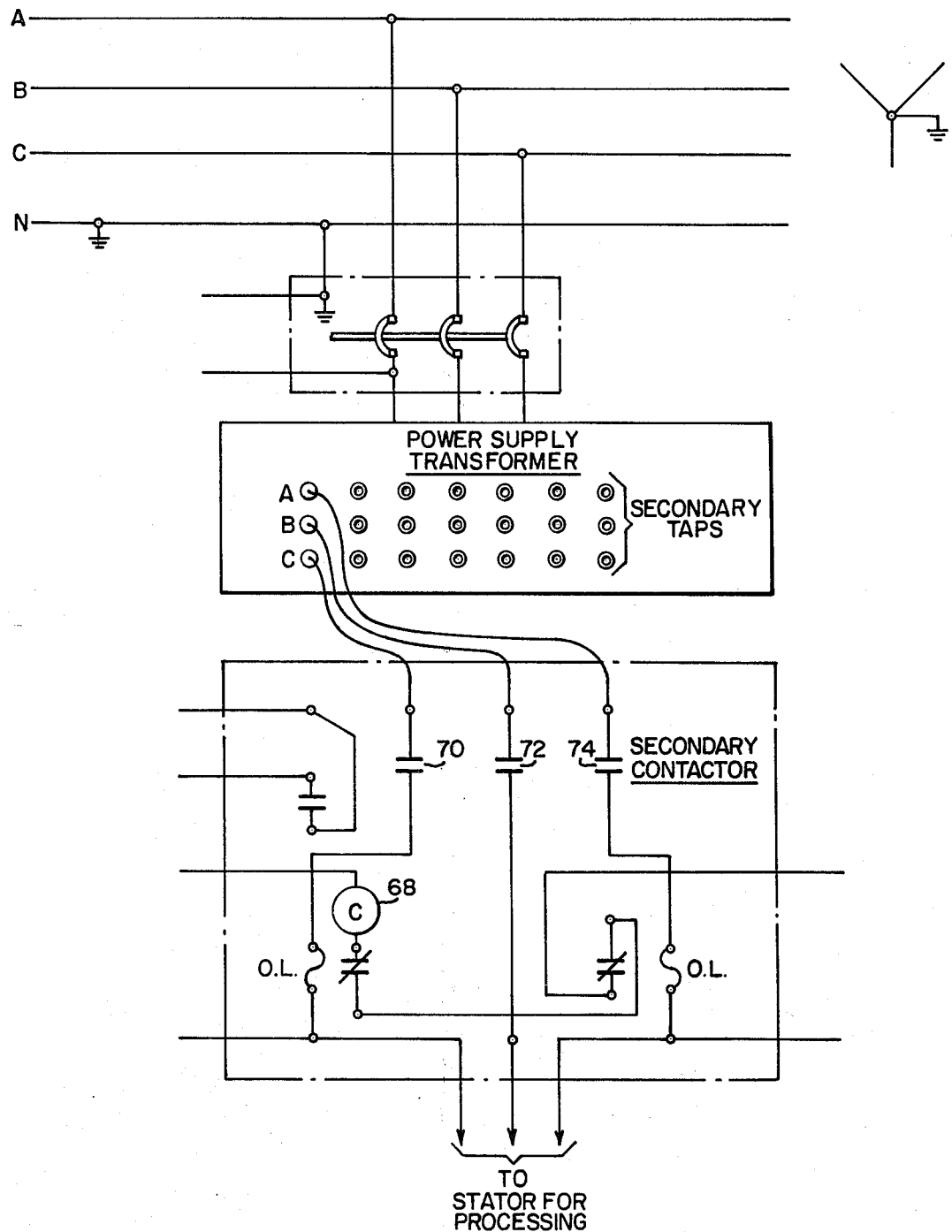
FIG. 2 is a power schematic for connecting the heating power supply to the electric coil to be heated.
Figure 3:
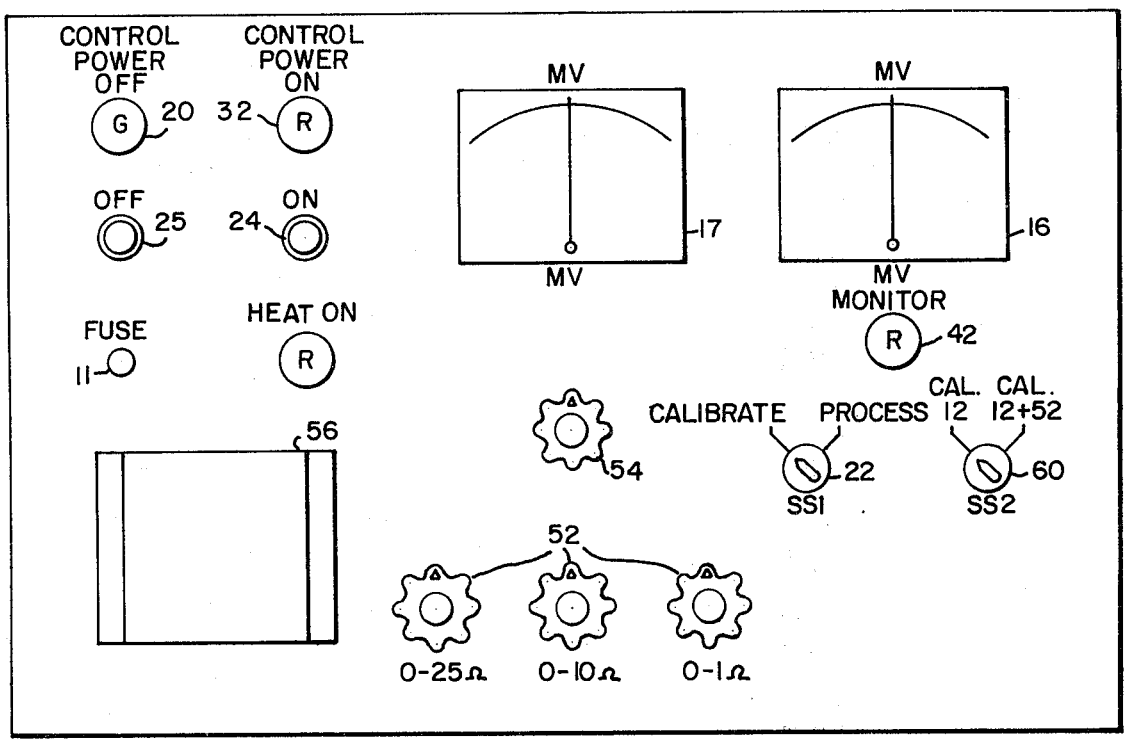
FIG. 3 is a front view of a panel housing the circuit utilizing the teaching of the present invention.

Referring now to the drawings and FIG. 1 in particular is shown a schematic of an electrical circuit 10 utilizing the teaching of the present invention. The disclosed system described utilizes a voltage drop observation, across a stator winding and resistor in series, for temperature monitoring and control of the stator winding 12, undergoing a process of epoxy resin impregnation. Stator winding 12 is alternately connected to a heating power supply 14 and the monitor controller 10. When the stator 12 is connected to the power supply 14 heating current flows therethrough. When the stator 12 is connected to the monitor and controller 10, the temperature of the stator 12 is determined and if it is greater than the desired value reconnection to the heating power supply 14 is prevented.

Figure 4:
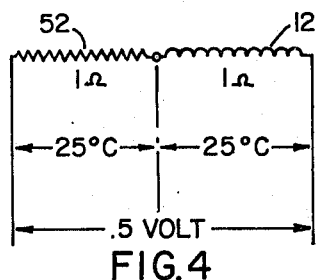
FIG. 4 is a schematic of a stator winding and external resistor at a 25°C ambient; and, FIG. 5 is similar to FIG. 4 but with the stator at 140°C.
Figure 5:
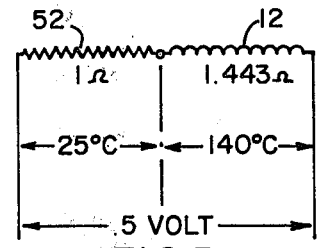

The principle upon which monitor controller 10 operates, is derived from the fact that if a copper resistance is connected in series with an equal resistance and a potential is supplied across them the voltage drop across each will be equal to one-half of the applied voltage. If the potential is established at a determined temperature, heating the copper resistance will increase its ohmic value such that at any temperature above the reference ambient it will have a greater voltage drop that is a product of the applied voltage and a temperature dependent factor. Thus, if the applied voltage is held constant and the external resistance remains at the ambient temperature, the voltage drop across the copper resistance is proportional to temperature. In other words, in a series circuit with a fixed voltage a copper resistance matched at some ambient temperature with an equal resistance, maintained at ambient, will have a voltage drop at an alternate temperature which is proportional to temperature. If the ratio of the external resistance and the applied voltage is constant, the voltage drop across the copper resistance will be a constant for a given temperature. That is, the temperature of various size stators can be determined by matching the stator resistance with an external resistor of equal value and applying a potential across the stator winding and the external resistor in series, so that the voltage drop across the stator winding is proportional to temperature. This can best be understood with reference to schematic 4 and 5 which show an external resistor 52 connected in series with stator winding 12. FIG. 4 shows the stator winding and the external resistor both at an ambient temperature of 25°C. FIG. 5 shows the external resistor still at an ambient temperature of 25°C while the stator winding is at a temperature of 140°C. The basic calculations for determining the voltage drop across the resistor 16 at a temperature of 140°C are as follows:

$$\frac{r}{R} = \frac{234.5 + t}{234.5 + T}$$

$$\frac{1}{R} = \frac{259.5}{374.5}$$

$$R = 1.443 \text{ Ohms}$$

$$I = \frac{E \text{ total}}{\text{Resistance of Resistor 16} + R} = \frac{.5}{2.443}$$

$$I = 0.205 \text{ amp.}$$

$$E\text{copper} = 0.205 \times 1.443$$

$$= 0.2953 \text{ volts}$$
$$295.3 \text{ millivolts}$$

$r=$ resistance at ambient
$R=$ resistance at the ultimate temperature
$t=$ ambient temperature
$T=$ ultimate temperature
$I=$ current
$E=$ voltage For the example illustrated the applied direct current potential $E$ total was chosen as 500 millivolts. If the applied potential is other than 500 millivolts, the voltage drop to be expected which indicates 140°C must be adjusted by a fact determined from:

$$\frac{.2953}{\frac{.500}{2}} = 1.1813 \text{ (correction factor)}$$

Copper resistance of any value winding 12 connected as shown in FIGS. 4 and 5 with an external resistance 52 in series and 500 millivolts across both such that the voltage drop across each is 250 millivolts at 25°C will result in there being 295.3 millivolts across the copper resistance at 140°C, if the applied voltage remains at 500 millivolts and the external resistance is maintained at 25°C. If a potential other than 500 millivolts is applied across the winding 12 and the resistor 52 in series, the expected voltage across the copper resistance 12 must be adjusted by the correction factor 1.1813. The expected voltage drop at $E$ total other than 500 millivolts can be determined from:

$$E\text{copper } (140°C) = \frac{E \text{ total}}{2} \times 1.1813$$

Utilizing the above calculations tables can be established for various desired process temperatures with $E$ total equal to 500 millivolts. For example, at a 140°C process temperature, table of set points with a 500 millivolt applied voltage is as follows:

| AMBIENT TEMPERATURE DEGREES CENT. | E COPPER MV2 SET POINT MILLIVOLTS | CORRECTION FACTOR |
|---|---|---|
| 20 | 297.7 | 1.1908 |
| 21 | 296.9 | 1.1876 |
| 22 | 296.8 | 1.1872 |
| 23 | 296.3 | 1.1852 |
| 24 | 295.8 | 1.1832 |
| 25 | 295.3 | 1.1813 |
| 26 | 294.9 | 1.1795 |
| 27 | 294.4 | 1.1777 |
| 28 | 294.0 | 1.1758 |
| 29 | 293.5 | 1.1740 |
| 30 | 293.0 | 1.1721 |
| 31 | 292.6 | 1.1703 |
| 32 | 292.1 | 1.1685 |
| 33 | 291.7 | 1.1667 |
| 34 | 291.2 | 1.1649 |
| 35 | 290.8 | 1.1630 |

The first column indicates the starting ambient temperature as read in the vicinity of the stator prior to the heat period. The second column indicates the voltage drop to be expected across the stator winding 12 at the ultimate desired temperature. Thus for a stator, initially at a temperature of say 25°C, and a final process temperature of 140°C, referring to the table it can be seen that the voltage drop across the winding will reach 295.3 millivolts when the applied voltage is 500 milivolts. The third column indicates the correction factor to be used for correction if an applied voltage other than 500 millivolts is used.

A normal operating sequence for the monitor controller 10 will be now described in detail. An operator determines the ambient temperature of the winding to be processed and the external resistor which should both be the same. Assuming an ambient of 25°C the expected voltage for the resistor and winding drop across the stator at a temperature of 140°C is 295.3 volts. Millivolt meter 16 which can be connected to read the voltage drop across stator 12 has an adjustable set point which can be set to activate a pair of contacts 18, when a preset voltage level is exceeded. Millivolt meter 16, for a 140°C ultimate temperature and a 500 millivolt monitoring output voltage would be set for 295.3 volts. Power can be applied to circuit 10 and lamp 20 will glow green indicating power is available. Electric switch 22 is then set on the calibrate position. ON button 24 is then depressed allowing power to flow through relay 26, which is energized picking up contacts 28 and sealing itself into the circuit. When relay 26 is energized, a pair of its normally closed contacts 30 disposed in series with lamp 20 open up and lamp 20 is deenergized. When relay 26 seals itself in through normally open contacts 28 red indicating lamp 32 is energized. When relay 26 is energized the main contacts 34 and 36 close allowing power flow through switch 22, which is set in the calibrate position, to energize relays 38 and 40. Yellow light 42 is also energized at this time. When contactor 38 is energized, normally open contacts 44 and 46 are closed to connect power to the lower portion of the monitor and control circuit 10. Contactor 40 which is in parallel with contactor 38 is also energized at this time closing normally open contacts 48 and 50 to connect the stator 12 being heated to the monitoring and control circuit 10. A variable resistor 52 is connected in series with stator winding 12 when contacts 48 and 50 close. Variable voltage transformer 54 supplies a DC potential to the stator winding 12 through transformer 56 and full wave rectifier bridge 58. During normal operation variable transformer 54 is adjusted until a 500 millivolt output potential is attained. With switch 60 in the lower position as indicated by the dotted lines millivolt meter 17 is connected to read the direct current output voltage of the full wave rectifier bridge 58 which is applied to resistor 52 and stator winding 12 in series. Variable transformer 54 is adjusted until a 500 millivolt output is indicated on millivolt meter 17. Switch 60 is then moved to the upper position connecting millivolt meter 17 across the variable resistor 52. Millivolt meter 16 remains connected across the stator winding 12. The variable resistor 52 is now adjusted until both millivolt meters 16 and 17 indicate 250 millivolts. When the total applied voltage indicated is 500 millivolts and both millivolt meters 16 and 17 indicate 250 millivolts, the resistance of the variable resistor 52 is equal to the resistance of the stator winding 12. During calibration it may be necessary to operate switch 60 back and forth several times to assure the applied voltage remains at 500 MV, with a 250 MV drop across the stator and resistor. With the output potential equal to 500 millivolts and millivolt meter 16 showing a 250 millivolts drop across the stator winding 12 and millivolt meter 17 showing a 250 millivolt drop across variable resistor 52, switch 22 is switched to the process position indicated in dashed lines. The monitor portion of control circuit 10 is now calibrated and can be used for controlling the heating of stator winding 12.

When switch 22 is switched to the process position, contactors 38 and 40 are deenergized opening contacts 44, 46 48 and 50. The entire monitoring portion of the circuit 10 is now isolated from both the line and stator winding 12. Once switch 22 is moved to the process position, contactors 62 and 64 are energized through normally closed contacts 66 which are controlled by relay 38. Contacts 65 which are controlled by coil 64 also close sealing in coil 62 and 64. When contactor 64 is energized, normally open contacts 67 close energizing contactor 68 which closes contacts 70, 72 and 74 applying power to the stator 12. When power is applied to the stator winding 12, it begins to heat up due to the current flow therethrough. When contactor 68 is energized applying power to the stator 12, red lamp 76 is also energized indicating that heating power has been applied. Relay 62 includes a pair of time delay closing contacts 78 disposed in series with relays 80 and 82. When contacts 78 close, in a time delayed period after relay 64 is energized, contactors 80 and 82 are picked up and seal themselves in through contact 84. Contact 84 is controlled by relay 82. Normally closed contacts 86 of relay 82 are disposed in series with the circuit connected through switch 22 in the process position. When relay 82 is energized, contacts 86 open dropping out relays 62, 64 and 68. Contacts 88 of relay 82 close when relay 82 is energized picking up relays 38 and 40. Normally closed contacts 90 of relay 64 and 92 of contactor 68 are connected in series with relays 38 and 40 to assure that when relay 64 or contactor 68 is energized, relays 38 and 40 cannot be energized. With relay 82 energized the monitoring circuit is now connected to the stator 12 and the stator 12 is disconnected from the power supply 14. Contacts 94 are delayed opening, so that they open a set time after relay 80 is energized. With the monitoring and control circuit 10 connected to the stator if the temperature of the stator winding 12 is still below 140°C when the delayed opening contacts 94 of relay 80 open after the delay time, relays 80 and 82 will be deenergized and power will be again applied to the stator 12. That is, contacts 94 are set to open a given time delay, perhaps 4 to 5 seconds, after which 80 is energized and if during that time the temperature of stator 12 does not exceed the set level 140°C, relays 80 and 82 will be deenergized. This opens contacts 88 of relay 82 which in turn cause relays 38 and 40 to deenergize; at this time relays 62, 64 and contacts 68 will energize disconnecting the monitoring and control circuit 10 from the stator winding 12 and reapplying heating power to the stator 12 through contacts 70, 72 and 74.

If while relays 38 and 40 are energized, the stator 12 is above the desired temperature of 140°C, the millivolt meter 16 will close the meter control contacts 18 which parallel the time to open contacts 94, so that, even though contacts 94 open after the monitoring time delay, relays 80 and 82 will be kept held in by meter contacts 18. Thus, the stator 12 will not again have heating power applied to it until it has cooled sufficiently to lower the resistance of its winding so that the voltage drop across the stator winding 12 is less than the set point of millivolt meter 16 allowing relays 80 and 82 to drop out. The cycle of heating stator windings and interrupting power to the stator winding until they have cooled below the desired temperature level is repeated for as long as desired to process the stator 12. Once stator processing is complete, the operator presses OFF button 25 deenergizing relay 26 thus deenergizing the monitoring and control circuit portions of circuit 10. Thus, it can be seen that, during operation the monitoring and control circuit can control the temperature of the stator winding 12 in a small band around the desired set temperature. The width of the band, about which the stator temperature fluctuates during control, can be varied by varying the length of time during which power is applied to the stator 12. Timer relay 80 is in control only when millivolt meter 16 is below the set point and the unit is in the monitoring mode. Power off time during which the indication of millivolt meter 16 is above the set point is controlled by millivolt meter 16 and return of heating power dependent upon the rate of cooling of the stator rather than any fixed set time interval.

Thus, it can be seen that the temperature of the stator is controlled without using a separate temperature sensor near the windings. The temperature of the stator is controlled by using its own change in resistance at different temperatures. This provides inexpensive and reliable temperature control, requiring no external detectors embedded in winding insulation.

I claim:

1. A circuit for controlling heating of a resistive element comprising:

switching means switchable between a heating position, connecting the resistive element to a power line, and a monitoring position connecting the resistive element to a monitoring circuit;

a first time delay relay, connected to said switching means, for maintaining said switching means in the heating position for a first time delay when activated;

a resistor connected in series with the resistive element when said switching means is in the monitoring position;

a fixed potential connected across the resistive element and said resistor in series when said switching means is in the monitoring position;

a second time delay relay connected to be activated when said switching means is switched from the heating position to the monitoring position;

a voltage sensitive relay connected to be activated until the voltage drop across said resistor decreases below a predetermined level; and, said second time delay and said voltage sensitive relay connected to said switching means for switching said switching means to the heating position when a second time delay, determined by said second time delay relay, and the voltage across said resistor, sensed by said voltage sensitive relay, is below a predetermined level.

* * * * *